United States Patent
Tanaka

(10) Patent No.: US 6,495,679 B1
(45) Date of Patent: Dec. 17, 2002

(54) STARCH ESTER

(75) Inventor: Hideyuki Tanaka, Hekinan (JP)

(73) Assignee: Japan Corn Starch Co., Ltd., Aichi (JP)

( * ) Notice: Subject to any disclaimer, the term of this patent is extended or adjusted under 35 U.S.C. 154(b) by 0 days.

(21) Appl. No.: 09/647,931

(22) PCT Filed: Nov. 10, 1999

(86) PCT No.: PCT/JP99/06252

§ 371 (c)(1),
(2), (4) Date: Oct. 16, 2000

(87) PCT Pub. No.: WO00/31144

PCT Pub. Date: Jun. 2, 2000

(30) Foreign Application Priority Data

Nov. 25, 1998 (JP) ............................. 10-334665

(51) Int. Cl.⁷ .......................... C08B 31/02; C08B 33/02
(52) U.S. Cl. ....................................... 536/107
(58) Field of Search ........................................ 536/107

(56) References Cited

U.S. PATENT DOCUMENTS

| | | | |
|---|---|---|---|
| 5,656,682 A | 8/1997 | Rimsa et al. .................. | 524/37 |
| 6,011,092 A | * 1/2000 | Seppala et al. ................ | 524/47 |

FOREIGN PATENT DOCUMENTS

| | | |
|---|---|---|
| EP | 791 604 | 8/1997 |
| JP | 56-81301 | 7/1981 |
| JP | 10-25301 | 1/1998 |
| JP | 10-292001 | 11/1998 |

OTHER PUBLICATIONS

Fringant C. et al:"Preparation of mixed esters of starch or use of an external plasticizer: two different ways to change the properties of starch acetate films" Carbohydrate Polymers, Applied Science Publishers, Ltd. Barking, GB, vol. 35, No. 1–2, Jan. 2, 1998, pp. 97–106.

* cited by examiner

*Primary Examiner*—Nathan M. Nutter
(74) *Attorney, Agent, or Firm*—Rader, Fishman & Grauer PLLC

(57) ABSTRACT

The present invention relates to a starch ester having short- and long-chain acyl groups wherein hydrogens in reactive hydroxyl groups in the same starch molecule have been replaced by $C_{2-4}$ short-chain acyl groups and $C_{6-18}$ long-chain acyl groups. The degree of substitution by the short- and long-chain acyl groups are regulated so as to make the starch ester thermo-plasticized and moldable even in the absence of a plasticizer. Accordingly, the starch ester of the present invention can be used as a biodegradable thermoplastic plastic material which can be thermo-plasticized in the absence of a plasticizer.

11 Claims, No Drawings

STARCH ESTER

TECHNICAL FIELD

The present invention relates to a starch ester wherein reactive hydroxyl groups in the same starch molecule have been replaced by acyl groups and groups derived therefrom (hereinafter referred to collectively as "acyl groups"). Further, the present invention relates to a starch ester preferable as a base polymer in biodegradable starch-based plastic processed articles.

As used herein, the plastic processed articles include molded processed articles and modified processed articles molding-processed or modified as a whole or partially with a plastic composition, and the molding processing includes injection molding, extrusion molding, inflation, T-die extrusion, calendering, compression molding (press molding), transfer molding, casting, laminating, vacuum molding, blow molding, foam molding, coating, flow casting, heat fusion, stretching etc. (see 5th Handbook of Chemistry, Applied Chemistry I, p. 773, Table 10.22, Mar. 15, 1995, compiled by the Japanese Society of Chemistry and published by Maruzen). Accordingly, the molded processed articles include not only molded articles having a three-dimensional form but also films, sheets, coated papers, etc. Further, the modified processed articles include not only papers, processed papers and non-woven fabrics, but also articles produced by adding starch-substituted derivatives as modifiers to papers, non-woven fabrics, etc., made of natural materials.

BACKGROUND ART

The basic method of modifying starch, associated with the present invention, is esterification (acylation), and the starch ester produced by this reaction has been known as low-substituted starch (starch ester) esterified in an aqueous reaction system ("Starch Science Handbook", K. K. Asakura Shoten, p. 550).

With respect to high-substituted starch ester (esterified starch), a method of reacting an acid anhydride in pyridine by use of dimethyl amino pyridine or an alkali metal as a catalyst ("Starch Chemistry & Technology" authored by Whistler, published by Academic Press, pp. 332–336), a method of reacting an acid anhydride at a high temperature of 100° C. or more by use of an aqueous solution of an alkali metal hydroxide as a catalyst (Japanese National Publication No. 508,185/1993, and p. 73 in the March issue of Die Starke, 1972), and a method of reaction in a non-aqueous organic solvent (Japanese Patent Laid-Open No. 188,601/1996) are known.

With an increasing awareness of environmental problems in recent years, starch esters produced by the methods described above have been used in various biodegradable plastic materials. However, these materials, whether used alone for forming molded articles or films or in combination with various synthetic resins, require a general-purpose plasticizer (phthalate type or fatty ester type) in order to achieve workability (for example, injection workability, extrusion workability, stretchability, etc.) at the same levels as ordinary thermoplastic plastics (thermoplastic resin).

Even if produced using the plasticizer, products such as injection-molded articles hardly achieve impact strength at the same levels as with impact strength polystyrene (high impact polystyrene). It has also been difficult to achieve molded articles having an impact resistance of 1.8 kgf·cm/cm (17.64 J/m) or more in terms of Izod impact strength (ASTM D256:-23° C.).

Further, products such as inflation films have hardly achieved stretchability (tensile elongation) as good as that of polyethylene.

In particular, these tendencies become significant as the ratio of the starch ester in the plastic composition (plastic material) to be molded is increased.

Even if a biodegradable resin (biodegradable polymer) other than the starch ester is mixed in an attempt to improve the impact strength or tensile elongation of the starch ester, the desired improvement effects cannot be attained unless the content of the biodegradable resin is made to be higher than the content of the starch ester. As a result, such products cannot truly be said to be biodegradable plastics that are based on a starch ester.

Further, the phthalate or fatty ester type plasticizer described above is suspected of being a physiologically disturbing substance, which adversely affects vegetables, foods, and the growth of animals. Accordingly, one should avoid adding the plasticizer described above to biodegradable plastics that are to be disposed of in landfills, etc.

In view of the foregoing, an object of the present invention is to provide a starch ester which can be used as a thermoplastic material capable of being thermo-plasticized in the absence of a plasticizer or by using a small amount of a plasticizer.

Another object of the present invention is to provide a starch ester from which a thermoplastic plastic material having superior impact strength and tensile elongation can be easily prepared.

DISCLOSURE OF INVENTION

The present inventors made extensive study regarding the development of safe biodegradable plastics in the absence of a plasticizer or by using a small amount of a plasticizer, by use of starch which is an abundant raw material produced every year. The result of these studies is the novel starch ester having the constitution described below.

The present invention relates to a starch ester wherein reactive hydroxyl groups in the same starch molecule have been replaced by a $C_{2-4}$ acyl group (referred to hereinafter as "short-chain acyl group") and a $C_{6-18}$ acyl group (referred to hereinafter as "long-chain acyl group"), and the extent of substitution by the short- and long-chain acyl groups are regulated so as to make the starch ester thermo-plasticized and moldable even in the absence of a plasticizer.

From the viewpoint of workability, the starch ester as used herein is preferably one having a glass transition point by differential thermal analysis (JIS K 7121: referred to hereinafter as "glass transition point") of 140° C. or less, preferably 130° C. or less. The lower limit of the glass transition point shall be usually 80° C., preferably 100° C.

To easily attain each characteristic, a starch ester having the workability or showing the glass transition point as described above is preferably one wherein the degree of substitution by the long-chain acyl group is from 0.06 to 2.0, the degree of substitution by the short-chain acyl group is from 0.9 to 2.7, and the degree of substitution by the total acyl groups is from 1.5 to 2.95, more preferably one wherein the degree of substitution by the long-chain acyl group is from 0.1 to 1.6, the degree of substitution by the short-chain acyl group is from 1.2 to 2.1, and the degree of substitution by the total acyl groups is from 1.7 to 2.9.

The starch ester of the present invention can also be used in a starch ester-based polymer alloy by incorporating the starch ester with a biodegradable resin. Polycaprolactone, polylactic acid or cellulose acetate can be used particularly preferably as the biodegradable resin.

Further, the starch ester of the present invention can be formed into a molded processed article which has been molded and processed as a whole or partially with said starch ester or a polymer alloy having said starch ester incorporated with a biodegradable resin.

The molded processed article can be formed into an injection-molded article showing a degree of water absorption (after immersion in tap water at 23° C. for 24 hours) of 0.5% or less and an Izod impact strength of 1.8 kgf·cm/cm, or into a film having a film thickness of 100 μm or less and a tensile elongation (JIS K 6301) of 200% or more.

Further, the starch ester of the present invention can be formed into a plastic processed article which has been molded and processed, or modified, as a whole or partially with a plastic composition comprising an organic or inorganic reinforcing filler added to said starch ester or to a polymer alloy which is an admixture of the starch ester and a biodegradable resin.

BEST MODE FOR CARRYING OUT THE INVENTION

Hereinafter, the means of the present invention is described in detail. The blend unit is expressed on a weight basis unless otherwise specified. In the following description, Cn in round brackets after each compound indicates that the number of carbons in acyl groups in the compound is n.

As used herein, the degree of substitution (DS) is the average number of reactive hydroxyl groups (that is, 3 hydroxyl groups at the 2-, 3- and 6- or 4-positions) replaced by substituent groups per glucose residue in a starch derivative, and when DS is 3, the degree of masking (substitution percent) of the reactive hydroxyl groups is 100%.

As a result of intensive study for solving the problem described above, the present inventors found that it is essential to confer thermoplasticity on starch itself in a practical temperature range in order to solve the problem, and it is important therefor to bind long-chain hydrocarbon-containing groups such as long-chain alkyl groups, cycloalkyl groups, alkylene groups and aryl groups, along with short-chain hydrocarbon-containing groups such as short-chain alkyl groups, cycloalkyl group a, alkylene groups and aryl groups, to the same starch molecule. By so doing, the present invention arrived at the novel starch ester with the constitution described below.

Said starch ester is conceptually shown in the structural formula:

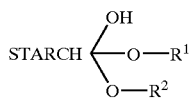

wherein $R^1$ is a $C_{2-4}$ short-chain acyl group, and $R^2$ is a $C_{6-18}$ long-chain acyl group.

Although the process for producing said starch ester is not particularly limited, the starch ester can be easily produced by a process constituted as follows (see Japanese Patent Laid-Open No. 188,601/1996 (Japanese Patent No. 2,579, 843)): "A process for producing a starch ester by using a vinyl ester as an esterification reagent wherein a vinyl ester having a $C_{2-18}$ ester group is reacted with starch in a non-aqueous organic solvent using an esterification catalyst."

That is, the biodegradable starch ester of the present invention can be easily synthesized through acylation (esterification) in a non-aqueous organic solvent by replacing reactive hydroxide groups in the same starch molecule by long-chain acyl groups derived from vinyl compounds, acid anhydrides-acid halides, alkyl ketene dimers or lactones, along with short-chain acyl groups from the same compounds.

By such means, the present inventors found for the first time that:

1) By these reactive groups, it is possible to synthesize starch esters exhibiting thermoplasticity during heating in the absence of a plasticizer or by using a small amount of a plasticizer;
2) These starch esters show a significantly higher miscibility with biodegradable resins other than said starch esters than that of existing highly modified starch esters (prepared by the known method described above); and
3) Molded processed articles formed as a whole or partially from a plastic composition based on said starch esters have impact resistance similar to that of impact-resistant (high impact) polystyrene.

As the starting starch for the starch ester of the present invention, (1) unmodified starch from on the ground (soil), such as corn starch, high amylose starch, wheat starch and rice starch, (2) unmodified starch in the ground, such as potato starch and tapioca starch, and (3) starch esters prepared by subjecting the above-described starches to low-degree esterification, etherification, oxidation, acid treatment, or conversion into dextrin; these starches can be used alone or in a combination thereof.

The acylation (esterification) reagent used for introducing $C_{6-18}$ long-chain acyl groups onto reactive hydroxyl groups by substitution reaction includes one or more members selected from alkyl ketene dimers, cyclic esters (caprolactones), acid anhydrides, acid halides and vinyl compounds having esterification (acylation) reactive sites having $C_{5-17}$ long-chain hydrocarbon groups bound to carbonyl groups (number of carbons in one molecule of the reagent: 6 to 18).

The long-chain hydrocarbon groups described above include an alkyl group, a cycloalkyl group, an alkylene group and an aryl group as well as groups derived therefrom. The derived groups include an aryl alkyl group (aralkyl), alkyl aryl group (alkaryl), and alkoxy alkyl group. The long-chain hydrocarbon groups also include active hydrogen groups such as a hydroxy alkyl group and an aminoalkyl group, insofar as the effect of the present invention is not adversely affected.

Among these compounds, esterification reagents having $C_{8-14}$ esterification reaction sites are preferable for reaction efficiency and handling.

The alkyl ketene dimers are constituted of a combination of various alkyl groups, as represented by the formula:

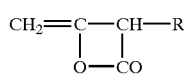

wherein R is a $C_{1-17}$ alkyl group, an alkylene group, an aryl group, or a group derived therefrom.

As the cyclic esters (caprolactones), ε-caprolactone (C6), γ-caprylolactone (C8), γ-laurolactone (C12) and γ-stearolactone (C18), as well as large cyclic lactones represented by the formula $(CH_2)_nCOO$ wherein n is an integer from 5 to 17; these can be used singly or in combination thereof.

As the acid anhydrides and acid halides, anhydrides and halides of caprylic acid (C8), lauric acid (C12), palmitic acid (C16), stearic acid (C18), oleic acid (C18), etc., can be used.

As the vinyl compounds, it is possible to use saturated or unsaturated vinyl aliphatic carboxylates such as vinyl caprylate (C8), vinyl laurate (C12), vinyl palmitate (C16), vinyl stearate (C18) and vinyl oleate (C18), and branched saturated vinyl aliphatic carboxylates represented by the following structural formula:

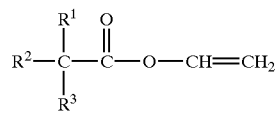

wherein all $R^1$, $R^2$ and $R^3$ are alkyl groups, and the number of carbons in these groups in total is from 4 to 16.

The non-aqueous polar organic solvent is one capable of dissolving the starting starch, and specifically, dimethyl sulfoxide (DMSO), dimethyl formamide (DMF), pyridine, etc., can be used alone or in a combination thereof, or these can be used as a mixture with another organic solvent.

The esterification (acylation) catalyst used includes one or more members selected from the following respective groups: (1) hydroxides, mineral acid salts, carbonates, organic compounds or alkali metal alkoxides of metals up to the 5th period in the Periodic Table, (2) organic-interlayer transfer catalysts, and (3) amino compounds. Among these, (1) is desirable from the viewpoint of reaction efficiency and catalyst costs.

Examples of the catalysts are as follows:
(1) Alkali metal hydroxides such as sodium hydroxide, potassium hydroxide and lithium hydroxide; alkali metal organic acid salts such as sodium acetate and sodium p-toluene sulfonate; alkaline earth metal hydroxides such as barium hydroxide and calcium hydroxide, alkaline earth metal organic acid salts such as calcium acetate, calcium propionate and barium p-toluene sulfonate; inorganic acid salts such as sodium phosphate, calcium phosphate, sodium hydrogen sulfite, sodium carbonate, sodium hydrogen carbonate, potassium carbonate, potassium hydrogen carbonate, potassium sulfate, sodium aluminate and potassium zincate; and amphoteric metal hydroxides such as aluminum hydroxide and zinc hydroxide; and (2) Amino compounds such as dimethyl amino pyridine and diethyl amino acetic acid,
as well as quaternary ammonium compounds such as N-trimethyl-N-propyl ammonium chloride and N-tetraethyl ammonium chloride. The timing and method of using these catalysts are not particularly limited.

The acylation (esterification) reagent used for introducing $C_{2-4}$ short-chain acyl groups onto reactive hydroxyl groups by substitution reaction includes one or more members selected from alkyl ketene dimers, cyclic esters (caprolactones), acid anhydrides, acid halides and vinyl compounds having esterification (acylation) reaction sites having $C_{1-3}$ short-chain hydrocarbon groups bound to carbonyl groups (that is, the number of carbons in each reagent molecule is from 2 to 4).

Specifically, the following compounds can be mentioned. Among these compounds, those acylation reagents having $C_{2-3}$ esterification reaction sites are preferable for reaction efficiency, microbial degradation and handling.

As the cyclic esters (caprolactones), γ-butyrolactone (C3) and β-propiolactone (C3) can be used singly or in combination thereof.

As the acid anhydrides and acid halides, anhydrides and halides of acetic acid (C2), propionic acid (C3), butanoic acid (C4), etc., can be used singly or in combination thereof.

As the vinyl compounds, vinyl acetate (C2), vinyl propionate (C3), vinyl butanoate (C4), vinyl acrylate (C3), vinyl isocrotonate (C4), etc., can be used.

Although the reaction temperature condition in the present invention is not particularly limited, the reaction temperature shall be usually 30° C. to 200° C., preferably 40° C. to 150° C. For almost all compounds, it will not be necessary to change these reaction temperatures.

With respect to the degree of substitution (DS) on the starch ester, the compatibility of the starch ester with a biodegradable resin as an object of the present invention is affected by the length of the long-chain acyl group. However, with the long-chain acyl group having the maximum number of carbons given, it is difficult to confer the desired characteristics on starch insofar as the degree of substitution (DS) by said acyl group is 0.05 or less (or the degree of masking of reactive hydroxyl groups is 2% or less). As the acyl group having the maximum number of carbons, the acyl group containing 19 or more carbon atoms is not practical because the reaction efficiency is extremely lowered thereby.

Usually, the DS by the long-chain acyl group is from 0.06 to 2.0 (degree of masking: 2% to 67%), the DS by the short-chain acyl group is from 0.9 to 2.7 (degree of masking: 30% to 90%), and the DS by the total acyl groups is from 1.5 to 2.95 (degree of masking: 50% to 98%).

Between the starch ester wherein the degree of substitution by the long-chain acyl group is minimal and the degree of substitution by the short-chain acyl group is maximal, and the starch ester wherein the degree of substitution by the long-chain acyl group is maximal and the degree of substitution by the short-chain acyl group is minimal, there is no extreme difference in the compatibility thereof with a biodegradable resin nor in the mechanical physical properties thereof. To achieve the same level of thermoplasticity in the absence of a plasticizer, the degree of substitution by the long-chain acyl group may be decreased as the number of carbons in said acyl group is increased.

Accordingly, the above-described numerical range has no particular critical importance, and the present invention can be carried out even in the vicinity of the above-described range.

Preferably, the DS by the long-chain acyl group is from 0.1 to 1.6 (degree of masking: 3% to 53%), the DS by the short-chain acyl group is from 1.2 to 2.1 (degree of masking: 40% to 70%), and the DS by the total acyl groups is from 2.0 to 2.9 (degree of masking: 67% to 97%).

The reason that the number of carbons in the short-chain acyl group shall be 4 or less is based on the experimental result that in the present invention, there is no difference in reaction efficiency among $C_{2-4}$ short-chain acyl groups.

With respect to the glass transition point (JIS K 7121) of the starch, the miscibility of the starch with the biodegradable resin becomes gradually poor as the transition point (transition temperature) is increased. Usually, the glass transition point shall be 140° C. or less, preferably 80° C. to 130° C. This is because if the glass transition point is higher than 140° C., miscibility becomes poor in the absence of a plasticizer. If a plasticizer is used, the starch ester is rendered miscible even at a temperature of higher than 140° C. and in a smaller amount of the plasticizer than is conventional.

Hereinafter, the biodegradable polymer (biodegradable resin) incorporated with the starch ester of the present invention to form a polymer alloy is described.

In the present invention, the term "incorporated" means that two or more materials are admixed with "compatibility", and the term "compatibility" refers to the state of two or more materials in which they are uniformly and mutually dispersed, including not only the state attained by mixing two or more materials having mutual miscibility, but also the state where two or more materials, although being mutually "immiscible", are uniformly dispersed.

As can also be easily judged from the above-described glass transition temperature (glass transition point), the starch ester of the present invention can be thermoplasticized without using an oily plasticizer. Further, the starch ester of the present invention does not require any plasticizer for blending thereof with the existent biodegradable resin, and the compatibility thereof is significantly improved as compared with that of starch esters produced in the prior art, such as high-substituted acetylated starch (acetate starch).

As the biodegradable polymer described above, the following polymers of a natural type (mainly cellulose type) or of a synthetic type (polymerized type) can be preferably used.

That is, the polymers of cellulose type include cellulose acetate, hydroxyethyl cellulose, propyl cellulose, hydroxybutyl cellulose, etc.

The polymers of polymerized type include:

(1) biodegradable polyesters or polyamides such as polycaprolactone (PCL), polylactic acid (PLA), polyadipate, polyhydroxy butyrate (polyhydroxy alkanoates), polyhydroxy butyrate valerate (PHB/V) and succinic acid-1,4-butanediol polymers;

(2) polyalkylene oxides such as polyethylene oxide and polypropylene oxide; and (3) vinyl polymers such as polyvinyl alcohol, modified polyvinyl alcohol, polyacrylamide-based resin, polycarbonate-based resin, polyurethane-based resin, polyvinyl acetate, polyvinyl carbazole, polyacrylate, and ethylene-vinyl acetate copolymers.

When the starch ester of the present invention or the polymer alloy described above is used as a base polymer to prepare a plastic material (starch ester-based composition), the following various fillers can be used as fillers that are used together with other auxiliary materials.

The form of the fillers can be selected arbitrarily as necessary from powder, granules, plates, cylinders, fibers and needles.

The inorganic fillers include talc, titanium oxide, clay, chalk, limestone, calcium carbonate, mica, glass, silica and various silica salts, diatomaceous earth, wall austenite, various magnesium salts, various manganese salts etc.

The organic fillers include starch and starch derivatives, cellulose and derivatives thereof, wood powder, pulp, pecan fibers, cotton powder, corn husk, cotton linter, wood fibers, bagasse, etc.

The synthetic fillers include glass fibers, urea polymers, ceramics, etc.

(1) Hereinafter, the Examples, Comparative Examples and Application Examples conducted for confirming the effect of the present invention are described.

EXAMPLE 1

25 g high amylose corn starch was suspended in 200 g dimethyl sulfoxide (DMSO), then heated to 90° C. under stirring, and kept at this temperature and gelatinized. 20 g of sodium bicarbonate was added as a catalyst to this solution, and while the temperature was kept at 90° C., 17 g of vinyl laurate (C12) was added thereto and reacted at the same temperature for 1 hour. Then, 37 g of vinyl acetate (C2) was added thereto, and reacted in the same manner as above at 80° C. for 1 hour. Thereafter, the reaction solution was poured into tap water, then stirred at high speed and ground, filtered, dehydrated and dried to prepare the starch ester of Example 1.

EXAMPLE 2

The starch ester of Example 2 was prepared in the same manner as in Example 1 except that acid-treated regular corn starch was used in place of high amylose corn starch, and 14 g vinyl stearate (C18) was used in place of vinyl laurate.

EXAMPLE 3

The starch ester of Example 3 was prepared in the same manner as in Example 1 except that 16 g chlorinated stearic acid (C18) was used in place of vinyl laurate.

EXAMPLE 4

100 g commercial corn starch with a water content reduced to 1% or less by preliminary drying, and 800 g DMSO, were introduced into a 2 L separable flask equipped with a stirrer, then heated at 90° C. and gelatinized by keeping it at this temperature for 20 minutes. After a solution of 5 g t-butyl bromide and 532 g hexadecyl ketene dimer (C17) was added dropwise thereto, the mixture was reacted at 90° C. for 5 hours in a system under reduced pressure, during which the DMSO was refluxed. Thereafter, the reaction system was returned to the atmospheric pressure, and a solution of 126 g acetic anhydride and 103.8 g sodium bicarbonate was added dropwise thereto, and the mixture was reacted for 1 hour at the reflux temperature thereof. After the unreacted materials and byproducts were allowed to flow out, the product was recovered under vigorous stirring in water, and then washed repeatedly 5 times with 5 L water to prepare the starch ester of Example 4.

EXAMPLE 5

The mixed ester of Example 5 was prepared in the same manner as in Example 1 except that 18.5 g of vinyl 2,2-dimethyltridecanoate (C15) was used in place of vinyl laurate.

EXAMPLE 6

The starch ester of Example 6 was prepared in the same manner as in Example 1 except that 27 g vinyl hexanoate was used in place of vinyl laurate.

Comparative Example 1

The starch ester (starch acetate) of Comparative Example 1 was prepared in the same manner as in Example 1 except that 39.9 g vinyl acetate (C2) only was used.

Comparative Example 2

25 g of high-amylose corn starch was suspended in 200 g DMSO and heated to 80° C. and gelatinized by keeping it at this temperature for 20 minutes. After 39 g of sodium bicarbonate was added for neutralization of an acid produced as a byproduct in this solution, the solution was cooled to a reaction temperature of 20° C., and 48 g acetic anhydride was added thereto at a reaction temperature kept at 20° C. to 25° C. so as to prevent hydrolysis of the starch. After acetic anhydride was added, the mixture was reacted at the same temperature for 1 hour. Thereafter, the starch ester of Comparative Example 2 was prepared in the same manner as in Example 1.

Comparative Example 3

46 g of high-amylose starch was introduced into a 1-L four-necked flask equipped with a reflux condenser, a dropping funnel and a thermometer, and 150 ml acetic anhydride was added thereto under stirring. Then, the mixture was heated until a certain ref lux occurred. The boiling temperature was about 125° C. After 1 to 2 hours, the viscosity increased, and after 3 to 4 hours, a viscous brownish transparent mixture was generated. After around 5 hours which was a necessary reaction time, 5 to 10 ml acetic acid was fractionated at 118° C., and then 20 ml ethanol was added dropwise to the reaction solution. The reaction solution was further stirred for 30 minutes under slightly suppressed heating. Then, the solvent mixture consisting of ethyl acetate and acetic acid, generated by the reaction of the ethanol with the acetic anhydride, was fractionated at 102° C. to 105° C. Then, heating was stopped, and the mixture was cooled for 0.5 to 1 hour. Subsequently, 20 ml ethanol was added again dropwise thereto. Thereafter, the product was gradually precipitated with about 200 ml methanol. The product was washed several times with alcohol, separated under suction and air-dried to prepare the starch ester of Comparative Example 3.

(2) The respective starch esters prepared in the Examples and Comparative Examples above were tested in regards to each of the following items.

Test 1

The degree of substitution (DS) by long- and short-chain acyl groups, and the glass transition point, were measured using the following respective methods.

(1) Degree of substitution by long- and short-chain acyl groups

Measured in accordance with the saponification method (Genung & Mallet, 1941) (see "Starch/Related Glucide Experimental Method", p. 291, published on Oct. 10, 1986, by K. K. Gakkai Shuppan Center).

The saponified product (alkali-hydrolyzed product) in a liquid phase, obtained by the above method, was separated and quantified by liquid chromatography for the ratios of long- and short-chain aliphatic acids simultaneously, to determine the degrees of substitution by long- and short-chain acyl groups.

(2) Glass transition point

Determined according to JIS K7121 by using the "Differential Scanning Calorimeter DSC-50" (Shimadzu Corporation).

The results are shown in Table 1. As can be seen from the table, the glass transition point is significantly lower in the presence of the long-chain acyl group than in the absence of the long-chain acyl group, even at almost the same degree of substitution of hydroxyl groups. This suggests that the starch ester can be thermo-plasticized in the absence of a plasticizer.

TABLE 1

|  | DS by long chain | DS by short chain | Total DS | Glass trans. point |
| --- | --- | --- | --- | --- |
| Example 1 | 0.5 (C12) | 1.95 (C2) | 2.45 | 110° C. |
| Example 2 | 0.3 (C18) | 1.95 (C2) | 2.25 | 120° C. |

TABLE 1-continued

|  | DS by long chain | DS by short chain | Total DS | Glass trans. point |
| --- | --- | --- | --- | --- |
| Example 3 | 0.3 (C18) | 1.93 (C2) | 2.23 | 117° C. |
| Example 4 | 0.23 (C17) | 1.89 (C2) | 2.12 | 103° C. |
| Example 5 | 0.45 (C15) | 1.88 (C2) | 2.33 | 115° C. |
| Example 6 | 1.43 (C6) | 1.35 (C2) | 2.78 | 105° C. |
| Comparative Example 1 | 0 | 2.45 (C2) | 2.45 | 165° C. |
| Comparative Example 2 | 0 | 2.40 (C2) | 2.40 | 170° C. |
| Comparative Example 3 | 0 | 2.20 (C2) | 2.20 | 167° C. |

Test 2

30 parts of the indicated biodegradable polymer was added to and mixed with 100 parts of each starch ester and mixed (mixing means: plastomill). The resulting compound was extruded into a 40 μm film (width, 120 mm) through a twin-screw extruder (L/D=32), and on the basis of the transparency of the film, the compatibility of each starch ester with the biodegradable polymer was judged.

In the Comparative Examples, 100 parts of each starch ester was plasticized by adding 40 parts of triacetin (glycerol triacetate) as the plasticizer, which was then mixed with the biodegradable polymer and thermo-plasticized.

The extrusion conditions were as follows: the plasticization temperature was 170° C., the T-die temperature was 170° C., the extrusion rate was 10 m/min., and the output was 3 kg/min.

The results are shown in Table 2. In the Examples where the long-chain group is introduced, all the products are judged to be transparent and highly compatible. On the other hand, it is judged that in the Comparative Examples where the short-chain group only is used, all the products are opaque, and even if the plasticizer is used, their compatibility is inferior.

TABLE 2

|  | PCL | PLA | Acetate Cellulose |
| --- | --- | --- | --- |
| Example 1 | transparent | transparent | transparent |
| Example 2 | transparent | transparent | transparent |
| Example 3 | transparent | transparent | transparent |
| Example 4 | transparent | transparent | transparent |
| Example 5 | transparent | transparent | transparent |
| Example 6 | transparent | transparent | transparent |
| Comparative Example 1 | opaque | opaque | opaque |
| Comparative Example 2 | opaque | opaque | opaque |
| Comparative Example 3 | opaque | opaque | opaque |

Test 3

15 parts of PCL were mixed with 100 parts of each starch ester (or in the Comparative Examples, with 100 parts of each starch ester after being thermo-plasticized by adding 20 parts of triacetin) and then thermo-plasticized to prepare a polymer alloy. The polymer alloy was used to prepare a test specimen, and the degree of water absorption and Izod impact strength of each test specimen were determined using the following methods.

Degree of water absorption

An injection-molded plastic disk (diameter 50 mm×thickness 3 mm) prepared from each specimen was immersed in tap water at 23° C. for 24 hours, and then examined for the amount of water absorbed therein.

Izod impact strength

Determined at an atmospheric temperature of −23° C. in accordance with ASTM D256.

The test results are shown in Table 3. As can be seen from the results, in the Examples where both the short- and long-chain groups are introduced, the degrees of water absorption are significantly lower than (nearly hundred times as low as) that of the Comparative Examples where the short-chain group only is used, and the Izod impact strength is also significantly higher than in the Comparative Examples.

TABLE 3

|  | Degree of water absorption (%) | Izod impact strength (kgf · cm/cm) |
| --- | --- | --- |
| Example 1 | 0.1 | 4.5 |
| Example 2 | 0.1 | 5.1 |
| Example 3 | 0.2 | 4.8 |
| Example 4 | 0.1 | 4.5 |
| Example 5 | 0.12 | 4.7 |
| Example 6 | 0.1 | 4.1 |
| Comparative Example 1 | 10.5 | 1.0 |
| Comparative Example 2 | 8.0 | 0.6 |
| Comparative Example 3 | 11.0 | 0.7 |

Test 4

40 parts of PCL were mixed with 100 parts of each starch ester (or in the Comparative Examples, with 100 parts of each starch ester after being thermo-plasticized by adding 40 parts of triacetin) and then thermo-plasticized to prepare a polymer alloy. The polymer alloy was used to prepare a thin film by an inflation processing unit (blowing bore diameter, 100 mm; cylinder diameter, 150 mm), and the characteristics thereof in the following items were observed or measured.

Inflation state: Visual observations.

Film thickness: Five sites of each film were measured by a micrometer for thickness, to determine the average thickness.

Film tensile elongation ($E_B$): Determined according to JIS K 6301.

The test results are shown in Table 4. High miscibility among resins is required of resins, in particular of blended resins, in order to prepare thin films by the inflation method. Mutually immiscible resins, even if they seem to be uniformly blended at a glance, are broken in forming a film due to insufficient melt elongation and tensile elongation. A polymer characterized by being capable of forming a thin film without breakage as described above is considered as worthy of a status that is different from polymers not having such characteristics.

TABLE 4

|  | State of inflation | thickness of thin film | tensile elongation of film |
| --- | --- | --- | --- |
| Example 1 | good | 40 μm | 560% |
| Example 2 | good | 20 μm | 600% |
| Example 3 | good | 40 μm | 450% |
| Example 4 | good | 40 μm | 500% |
| Example 5 | good | 25 μm | 380% |
| Example 6 | good | 25 μm | 350% |
| Comparative Example 1 | broken | not formable | — |
| Comparative Example 2 | broken | not formable | — |
| Comparative Example 3 | broken | not formable | — |

Industrial Applicability

As substantiated in the Examples and Comparative Examples described above, the starch ester of the present invention having long- and short-chain substituent groups consisting of alkyl, alkylene or aryl bound via an ester-type linkage to the same molecule can be thermo-plasticized, molded and processed without requiring any ester-based plasticizer which is needed for plasticizing conventional starch esters, other processed starch or unmodified starch.

Further, the starch ester of the present invention surprisingly demonstrates very high compatibility with biodegradable polymers such as conventional synthetic and fermented polyesters, and thus biodegradable polymer alloys meeting the performance required of products can be produced.

That is, by use of the starch ester of the present invention, a thermoplastic plastic material (starch ester-based composition) excellent in impact strength and tensile elongation can be easily prepared.

What is claimed is:

1. A starch ester wherein hydrogens in reactive hydroxyl groups in the same starch molecule have been replaced by $C_{2-4}$ acyl groups (referred to hereinafter as "short-chain acyl group") and $C_{6-18}$ acyl groups (referred to hereinafter as "long-chain acyl group"), and the degree of substitution by the short- and long-chain acyl groups are regulated so as to make the starch ester thermo-plasticized and moldable even in the absence of a plasticizer; and are regulated so that the glass transition point of the starch ester by differential thermal analysis (JIS K 7121: referred to hereinafter as the "glass transition point") is 130° C. or less.

2. A starch ester according to claim 1 wherein the degree of substitution by the short- and long-chain acyl group are regulated so that the glass transition point of the starch ester is in the range of 80° C. to 130° C.

3. The starch ester according to claim 1 or 2, wherein the degree of substitution by the long-chain acyl group is from 0.06 to 2.0, the degree of substitution by the short-chain acyl group is from 0.9 to 2.7, and the degree of substitution by the total acyl groups is from 1.5 to 2.95.

4. The starch ester according to claim 3, wherein the degree of substitution by the long-chain acyl group is from 0.1 to 1.6, the degree of substitution by the short-chain acyl group is from 1.2 to 2.1, and the degree of substitution by the total acyl groups is from 1.7 to 2.9.

5. A process for producing a starch ester of claim 1, wherein plural vinyl esters each having both short- and long-chain acyl groups are used as an esterification reagents and reacted with starch in a non-aqueous organic solvent by use of an esterification catalyst to synthesize the starch ester.

6. A starch ester wherein hydrogens in reactive hydroxyl groups in the same starch molecule have been replaced by $C_{2-4}$ acyl groups (referred to hereinafter as "short-chain acyl group") and $C_{6-18}$ acyl groups (referred to hereinafter as "long-chain acyl group"), and the degree of substitution by the short- and long-chain acyl groups are regulated so as to make the starch ester thermo-plasticized and moldable in the absence of a plasticizer.

7. A starch ester according to claim 6 wherein the degree of substitution of the reactive hydroxyl groups by the total acyl groups, the degree of substitution by the short- and long-chain acyl groups are regulated so that the glass transition point of the starch ester by differential thermal analysis (JIS K 7121: referred to hereinafter as the "glass transition point") is 140° C. or less.

8. The starch ester according to claim 7, wherein the glass transition point is in the range of 80° C. to 130° C.

9. The starch ester of claim 6 or 7, wherein the degree of substitution by the long-chain acyl group is from 0.06 to 2.0, the degree of substitution by the short-chain acyl group is from 0.9 to 2.7, and the degree of substitution by the total acyl groups is from 1.5 to 2.95.

10. The starch ester according to claim 9, wherein the degree of substitution by the long-chain acyl group is from 0.1 to 1.6, the degree of substitution by the short-chain acyl group is from 1.2 to 2.1, and the degree of substitution by the total acyl groups is from 1.7 to 2.9.

11. A process for producing a starch ester of claim 6, wherein plural vinyl esters each having both short- and long-chain acyl groups are used as an esterification reagents and reacted with starch in a non-aqueous organic solvent by use of an esterification catalyst to synthesize the starch ester.

* * * * *